(12) United States Patent
Dong et al.

(10) Patent No.: US 8,698,475 B2
(45) Date of Patent: Apr. 15, 2014

(54) SWITCHING-MODE POWER SUPPLY WITH RIPPLE MODE CONTROL AND ASSOCIATED METHODS

(75) Inventors: Yan Dong, San Jose, CA (US); Peng Xu, San Jose, CA (US)

(73) Assignee: Monolithic Power Systems, Inc., San Jose, CA (US)

(*) Notice: Subject to any disclaimer, the term of this patent is extended or adjusted under 35 U.S.C. 154(b) by 172 days.

(21) Appl. No.: 13/277,991

(22) Filed: Oct. 20, 2011

(65) Prior Publication Data
US 2013/0099761 A1 Apr. 25, 2013

(51) Int. Cl.
*G05F 1/00* (2006.01)
(52) U.S. Cl.
USPC ............................ 323/288; 323/282; 323/285
(58) Field of Classification Search
USPC ......... 323/222, 271, 282, 284, 285, 288, 223, 323/242, 243, 244, 283, 326
See application file for complete search history.

(56) References Cited

U.S. PATENT DOCUMENTS

| | | | | |
|---|---|---|---|---|
| 7,834,608 | B2* | 11/2010 | Cheng et al. | 323/299 |
| 2002/0125872 | A1* | 9/2002 | Groom et al. | 323/288 |
| 2007/0257643 | A1* | 11/2007 | Chen et al. | 323/222 |
| 2010/0001706 | A1* | 1/2010 | Nguyen | 323/288 |

* cited by examiner

*Primary Examiner* — Nguyen Tran
(74) *Attorney, Agent, or Firm* — Perkins Coie LLP (57) ABSTRACT

The present invention discloses a SMPS. The SMPS comprises an output port, configured to supply a load; a control signal generator, having an input and an output configured to provide a first control signal; a first switch configured to receive the first control signal and regulate the voltage at the output port; and a ramp signal generator, comprising an input and an output, wherein the input is configured to receive the control signal and the output is configured to provide a current signal simulating an output signal at the output port, and wherein the output of the ramp signal generator is further coupled to the input of the means for generating control signal.

19 Claims, 11 Drawing Sheets

SWITCHING-MODE POWER SUPPLY WITH RIPPLE MODE CONTROL AND ASSOCIATED METHODS

TECHNICAL FIELD

The present invention generally relates to switching-mode power supplies, and more particularly but not exclusively relates to buck converters with ripple mode control.

BACKGROUND

Switching-mode power supply (SMPS) is widely used to convert one voltage into another voltage which supplies a load. A SMPS contains a main switch and by controlling the switching action of the main switch, the output voltage can be regulated at a desired level.

Figure 1:
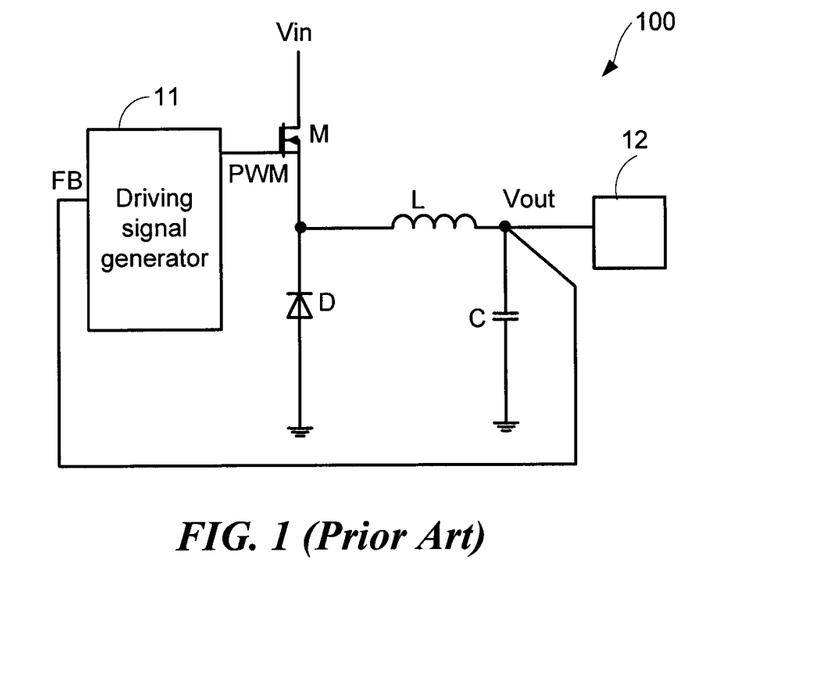
FIG. 1 shows a schematic diagram of a buck converter as a prior art.

A Buck converter is one type of SMPS which converts a Direct Current (DC) input voltage into a lower DC output voltage. FIG. 1 shows a schematic diagram of a buck converter 100 as a prior art. The buck converter 100 comprises a controller 11, a main switch M, an inductor L and an output capacitor C. The main switch M of buck converter 100 is regulated by a pulse width modulation (PWM) driving signal generated by the controller 11, and accordingly, the output voltage $V_{out}$ of the buck converter is regulated. When load 12 varies, the output voltage $V_{out}$ is disturbed and by sensing the output voltage Vout and offering an output feedback signal FB to controller 11, the duty cycle of the PWM signal is adjusted and $V_{out}$ is regulated to the desired level.

Ripple mode control is one type of control method for SMPS which controls the main switch based on a ripple component of the output voltage. For buck converter 100, since the main switch M is controlled by the PWM signal, the buck converter will generate a ripple current IL flowing through output inductor L. This ripple current will further generate a ripple component of $V_{out}$ due principally to the equivalent series resistance (ESR) of output capacitor C. The ripple component of $V_{out}$ equals IL*RESR. When $V_{out}$ with ripple component is lower than a reference voltage, main switch M is turned on. To achieve stable control, a large ripple component is needed. However, it is not expected because an output voltage with ripple component will affect the working of load 12. And further, a large ripple component requires a large ESR and the power efficiency decreases. Thus, a small ESR is desired and additional circuit is required to generate a ramp voltage signal similar to inductor current IL.

Figure 2:
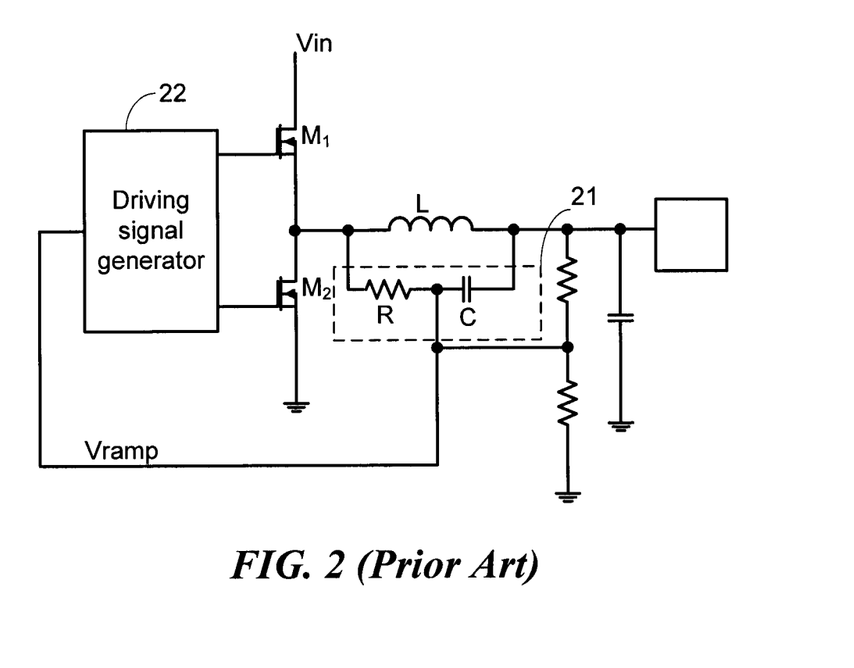
FIG. 2 shows a buck converter with a compensation circuit as a prior art.

A compensation circuit 21 is disclosed for ripple mode control in FIG. 2. The compensation circuit 21 comprises a resistor R1 and a capacitor C1 coupled to two ends of output inductor L. Compensation circuit 21 generates a ramp voltage signal $V_{ramp}$ similar to the shape of the output inductor current IL. However, when this compensation circuit 21 is an external circuit adopting discrete components, the components will consume a large space and the cost will increase. In some applications, this compensation circuit 21 is integrated with the control signal generator 22 in a die. However, when the compensation circuit 21 is built in the semiconductor die, the values of R and C are fixed and the slope of the generated ramp voltage signal can not be adjusted and thus can not be adapted to the various applications.

Accordingly, an improved method of generating ramp signal for ripple mode control is desired to at least overcome part of the above mentioned deficiencies.

SUMMARY

One embodiment of the present invention discloses a switching-mode power supply. This power supply may comprise an output port, a control signal generator, a first switch and a ramp signal generator. Wherein the output port may be configured to supply a load. The control signal generator may comprise an input and an output, wherein the output may be configured to provide a first control signal. The first switch may be configured to receive the first control signal and regulate the voltage at the output port. The ramp signal generator may comprise an input and an output wherein the input may be configured to receive the control signal, the output may be configured to provide a current signal simulating an output signal at the output port and wherein the output of the ramp signal generator is further coupled to the input of the control signal generator.

BRIEF DESCRIPTION OF THE DRAWINGS

Non-limiting and non-exhaustive embodiments are described with reference to the following drawings. The drawings are only for illustration purpose. Usually, the drawings only show part of the system or circuit of the embodiments.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 3A:
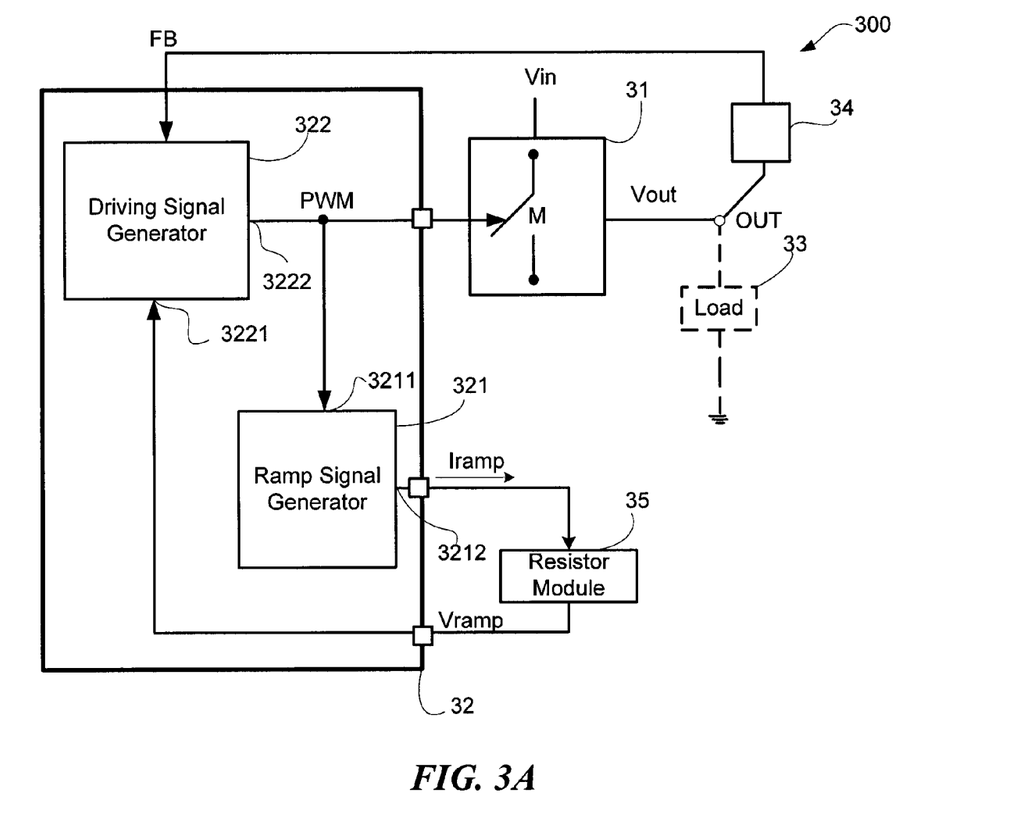
FIG. 3A illustrates a schematic block diagram of a SMPS system according to an embodiment of the present invention.

FIG. 3A illustrates a schematic block diagram of a SMPS system 300 according to an embodiment of the present invention. System 300 comprises a switching circuit 31 and a controller 32 for controlling the switching circuit 31. The switching circuit 31 comprises a main switch M and an output port OUT. The switching circuit 31 outputs a voltage $V_{out}$ at the output port OUT to supply a load 33. In one embodiment, the switching circuit 31 is a buck converter comprising a main switch M, a rectifier, an output inductor and an output capacitor coupled in a configuration as shown in FIG. 1A and FIG. 2. Where the main switch M is controlled by the controller 32 and switches to regulate the output voltage $V_{out}$. In other embodiments, the switching circuit 31 may be other types of converters such as boost converter or buck-boost converter. Signal FB representing the output voltage $V_{out}$ is fed back to the controller 32 for generating a duty cycle control signal PWM. In one embodiment, the feedback signal FB is generated by a feedback circuit 34 from sensing the output voltage $V_{out}$ at the output port OUT. In another embodiment, the feedback signal FB directly equals the value of the output voltage $V_{out}$.

Continuing with FIG. 3A, the controller 32 comprises a ramp signal generator 321 and a control signal generator 322. The control signal generator 322 has an input 3221 configured to receive a ramp signal $V_{ramp}$ and has an output 3222 configured to provide the control signal PWM. The control signal PWM is generated partly based on the ramp voltage signal $V_{ramp}$. The control signal generator 322 further is configured to receive the feedback signal FB for generating the control signal PWM. In one embodiment, the main switch M receives control signal PWM and regulates voltage $V_{out}$ at the output port OUT. The ramp signal generator 321 is used for slope compensation in ripple mode control. The ramp signal generator 321 generates a ramp current signal $I_{ramp}$ and is converted into a ramp voltage signal $V_{ramp}$ by a resistor module 35. The ramp voltage signal $V_{ramp}$ is added to the feedback signal FB ($V_{ramp}$+VFB) for generating the control signal PWM. In one embodiment, when the summed voltage $V_{ramp}$+VFB is lower than a threshold, the PWM is set HIGH to turn on main switch M. The PWM signal remains HIGH for a constant on time period, and after the constant on time period, the PWM signal turns LOW. And when $V_{ramp}$+VFB is lower than the threshold, the PWM is set HIGH again for another cycle. The ramp signal generator 321 comprises an input terminal 3211 and an output terminal 3212. The input terminal 3211 is configured to receive the duty cycle control signal PWM. And at least partly based on PWM, the ramp signal generator 32 generates the current signal $I_{ramp}$ at the output terminal 3212. The current signal $I_{ramp}$ simulates at least a period of an output signal for catching the point to start a cycle of switching. The output signal can be but not exclusively include the output voltage or the output current. In one embodiment, the ramp current signal $I_{ramp}$ simulates the current flowing through the output inductor during the period when the output inductor current is decreasing. In one embodiment, $I_{ramp}$ simulates the output voltage $V_{out}$ during the period when $V_{out}$ is decreasing.

Continuing with FIG. 3A, the current signal $I_{ramp}$ is converted into the ramp voltage signal $V_{ramp}$ by a resistor module 35. The resistor module 35 has an equivalent resistance value R, and the ramp voltage signal has an equation of: $V_{ramp}=I_{ramp}*R$. If a higher slope of a ramp voltage signal is required, a larger resistance of the resistor module can be selected. And if a lower slope of a ramp signal is required, a smaller resistance can be selected. The resistor module 35 is external to the controller 32. Accordingly, the slope of the ramp voltage signal can be adjusted externally.

Figure 4:
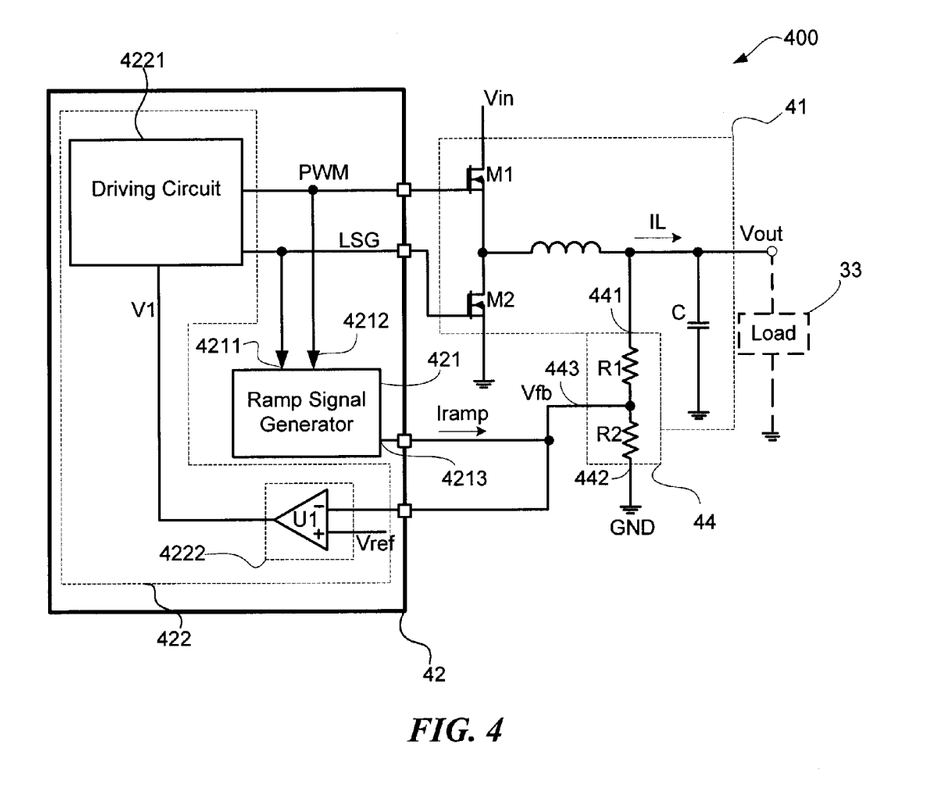
FIG. 4 illustrates a buck converter system according to an embodiment of the present invention.

In one embodiment with reference to FIG. 4, no separate resistor module exists and the resistor module shares the components of a feedback circuit 44. And accordingly, a ramp voltage signal does not actually separately exist and is combined with a feedback signal of an output voltage $V_{out}$.

Figure 3B:
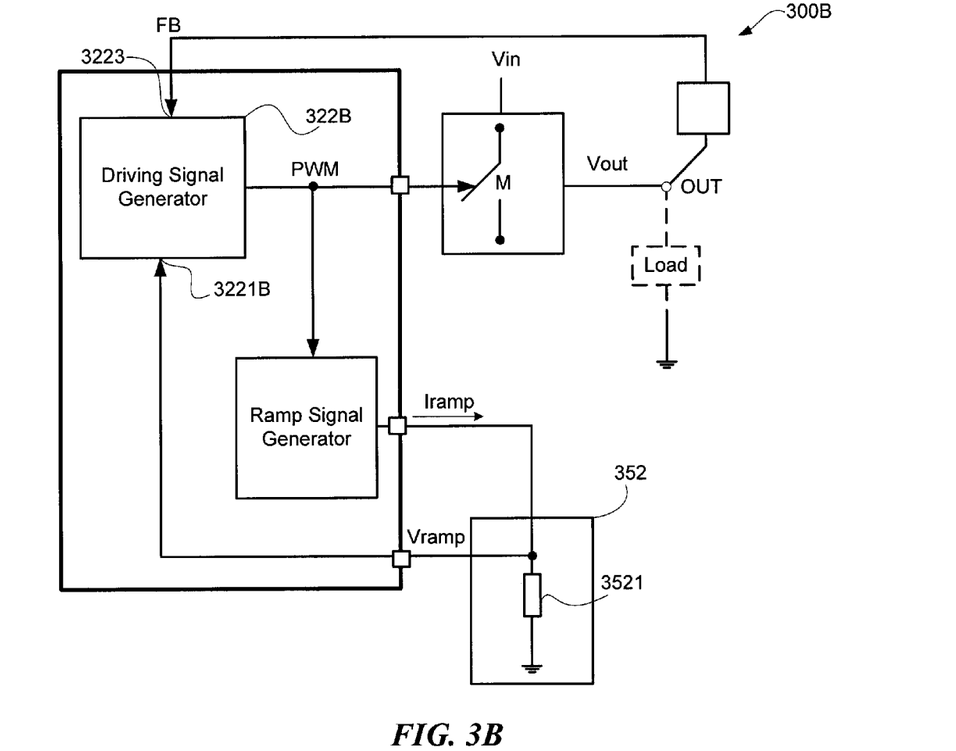
FIG. 3B illustrates a block diagram of a SMPS system having a separate resistor module according to an embodiment of the present invention.

In another embodiment with reference to FIG. 3B, the resistor module 352 is a separate circuit or component(s), and the ramp voltage signal $V_{ramp}$ is coupled directly to one input 3221B of the control signal generator 322B while a feedback signal FB of an output voltage $V_{out}$ is coupled to another input 3223 of the control signal generator 322B. In FIG. 3B, the separate resistor module 352 comprises a resistor 3521.

FIG. 4 illustrates a buck converter system 400 according to an embodiment of the present invention. The buck converter system 400 comprises a switching circuit 41, a controller 42 and a feedback circuit 44. The switching circuit 41 is a switching-mode buck converter, comprising a main switch M1, a rectifying switch M2, an output inductor L, an output capacitor C and an output port OUT. The output voltage $V_{out}$ at the output port OUT is used to supply a load 33. The main switch M1 is coupled to a first control signal PWM and regulates the output voltage $V_{out}$ at the output Port OUT. The synchronous rectifier M2 is coupled to a second control signal LSG. In one embodiment, the second control signal LSG is a complementary signal of the first control signal PWM. A gate driver circuit may be applied before switches M1 and M2 to pull up the first control signal PWM and the second control signal LSG to suitable values for controlling switches M1 and M2. The control signal generator 422 may also comprise a dead time circuit to add a dead time when the status of the first control signal PWM or the second control signal LSG changes. Under the control of control signals PWM and LSG generated by controller 42, power switches M1 and M2 perform switching actions. And by controlling the duty cycle of the control signals PWM and LSG, the output voltage $V_{out}$ at the output port OUT is regulated. The rectifier M2 in the shown embodiment is a synchronous rectifier, and both the main switch M1 and the rectifier M2 are metal oxide semiconductor field effect transistors (MOSFETs). However, in some embodiments, the rectifier can also be a non-synchronous diode. In the shown embodiment, the controller 42 is fabricated in a semiconductor die. In another embodiment, the controller 42 and the main switch M1 are fabricated in a semiconductor die. And in yet another embodiment, the controller 42, the main switch M1 and the synchronous rectifier are fabricated in a semiconductor die.

Continuing with FIG. 4, the controller 42 comprises a ramp signal generator 421 and a control signal generator 422. The control signal generator 422 generates the first control signal PWM and the second control signal LSG. In the embodiment of non-synchronous converter applications, the control signal generator 422 generates only the first control signal PWM. The control signal generator 422 further comprises a driving circuit 4221 and a comparator 4222. The comparator 4222 comprises a non-inverting input coupled to a reference voltage $V_{ref}$, an inverting input coupled to the output 443 of the feedback circuit 44, and an output supplying a signal V1 to the driving circuit 4221. The comparator compares the voltage $V_{fb}$ at the output 443 of the feedback signal with the reference voltage $V_{ref}$. When $V_{fb}$ is lower than $V_{ref}$, the output signal V1 of the comparator 4222 is set logic HIGH. And when $V_{fb}$ is high than $V_{ref}$, the output signal V1 of the comparator 4222 is logic LOW. The feedback signal $V_{fb}$ has been compensated with a ramp voltage signal component generated from the ramp current signal $I_{ramp}$ and the feedback circuit 44.

Figure 8:
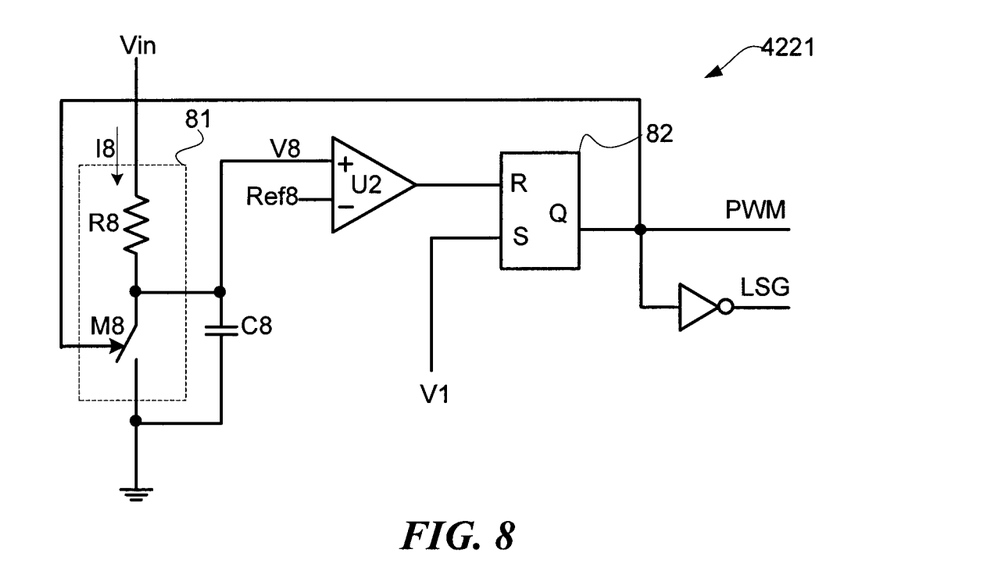
FIG. 8 illustrates a driving circuit according to an embodiment of the present invention.

In one embodiment, the driving circuit 4221 is a constant-on-time driving circuit. Once V1 changes from LOW to HIGH, signal PWM is set HIGH. Signal PWM remains HIGH for a constant time period Ton. And after the constant time period, PWM is reset LOW. And PWM will be set HIGH until the next time that V1 changes from LOW to HIGH. Signal PWM is coupled to the gate of the first switch M1. FIG. 8 illustrates a driving circuit 4221 according to an embodiment of the present invention. The driving circuit comprises a current source 81, a capacitor C3, a comparator U2 and an RS flip latch 82. In the shown embodiment, the current source 81 comprises a resistor R8 and a switch M8. When the voltage V1 turns HIGH, signal PWM is set HIGH. Switch M8 turns on for a while to discharge capacitor C8 to zero voltage and comparator U2 output LOW signal. And the output of flip latch 82 remains HIGH level. After capacitor C8 is discharged to zero, switch M8 turns off, and a current 18 generated by the input voltage $V_{in}$ and resistor R8 charges C8 and V8 increases. Once V8 is larger than Ref8, U2 outputs HIGH signal and flip latch 82 is reset LOW and the main switch is turned off. The on time period Ton is determined by the current source 81 of system frequency, capacitor C8 and reference voltage Rref8. Where current source 81 of system frequency can be controlled by resistor R8. In one embodiment, resistor R8 is an external component and the Ton can be controlled by changing resistor R8. Accordingly, the system frequency is modulated by the external resistor R8. For example, a large resistor R8 leads to a low current source 18, Ton is prolonged and system frequency is low.

The ramp signal generator 421 receives the first control signal PWM at a first input 4211, receives the second control signal LSG at a second input 4212, and generates a current signal $I_{ramp}$ at an output 4213. The current signal $I_{ramp}$ simulates at least a period of an output signal at the output port OUT. In the shown embodiment, the ramp current signal $I_{ramp}$ is supplied to an output 443 of the feedback circuit 44. The feedback circuit 44 comprises a first input 441, a second input 442 and the output 443. The first input 441 is coupled to the output port OUT, the second input 442 is coupled to a reference ground GND, and the output 443 is coupled to the output 4213 of ramp signal generator 421 and the inverting input of comparator 4222. Inside the feedback circuit 44, the feedback circuit 44 comprises a first resistor R1 and a second resistor R2 connected in series. Wherein R1 is coupled to the output port OUT through the first input 441, and R2 is coupled to the reference ground GND through the second input 442. And the common end of R1 and R2 comprises the output 443 of the feedback circuit 44. In such a configuration, the voltage $V_{fb}$ is determined by an equation:

$$v_{fb} = \frac{R_2}{R_1 + R_2} v_{out} + \frac{R_2 \cdot R_1}{R_1 + R_2} i_{ramp}$$

Thus, $V_{fb}$ includes the feedback signal of output voltage $V_{out}$:

$$\frac{R_2}{R_1 + R_2} v_{out}$$

and a ramp voltage signal component of $$\frac{R_2 \cdot R_1}{R_1 + R_2} i_{ramp}.$$

Where the equivalent resistance of a resistor module is $$\frac{R_2 \cdot R_1}{R_1 + R_2}$$

and the resistor module shares the components $R_1$ and $R_2$ of feedback circuit 44. In one embodiment, the current signal Iramp has a similar waveform with the current IL flowing through the output inductor L at least during the decreasing period of IL. Thus, the triggering point for set PWM HIGH can be captured once IL is below a predetermined threshold. And $$\frac{R_2 \cdot R_1}{R_1 + R_2} i_{ramp}$$

can be used for ripple mode control.

In one embodiment, the level of the ramp voltage signal $$\frac{R_2 \cdot R_1}{R_1 + R_2} i_{ramp}$$

can be adjusted by selecting the resistance values of $R_1$ and $R_2$ of the feedback circuit 44. In the shown embodiment, the feedback circuit 44 is a voltage divider and the ramp voltage signal can be adjusted by changing the resistance of $R_1$ and the resistance of $R_2$ with the same proportion. For example, if the ramp voltage signal $V_{ramp}$ needs to be doubled into $2V_{ramp}$, $R_1$ can be changed into $2R_1$ and $R_2$ can be changed into $2R_2$. That is:

$$\frac{2R_2 \cdot 2R_1}{2R_1 + 2R_2} i_{ramp} = 2 \cdot \frac{R_2 \cdot R_1}{R_1 + R_2} i_{ramp}.$$

At the meantime, since $R_1$ and $R_2$ change with the same proportion, the feedback component of the output voltage keeps the same as $$\frac{R_2}{R_1 + R_2} V_{out}.$$

Figure 5:
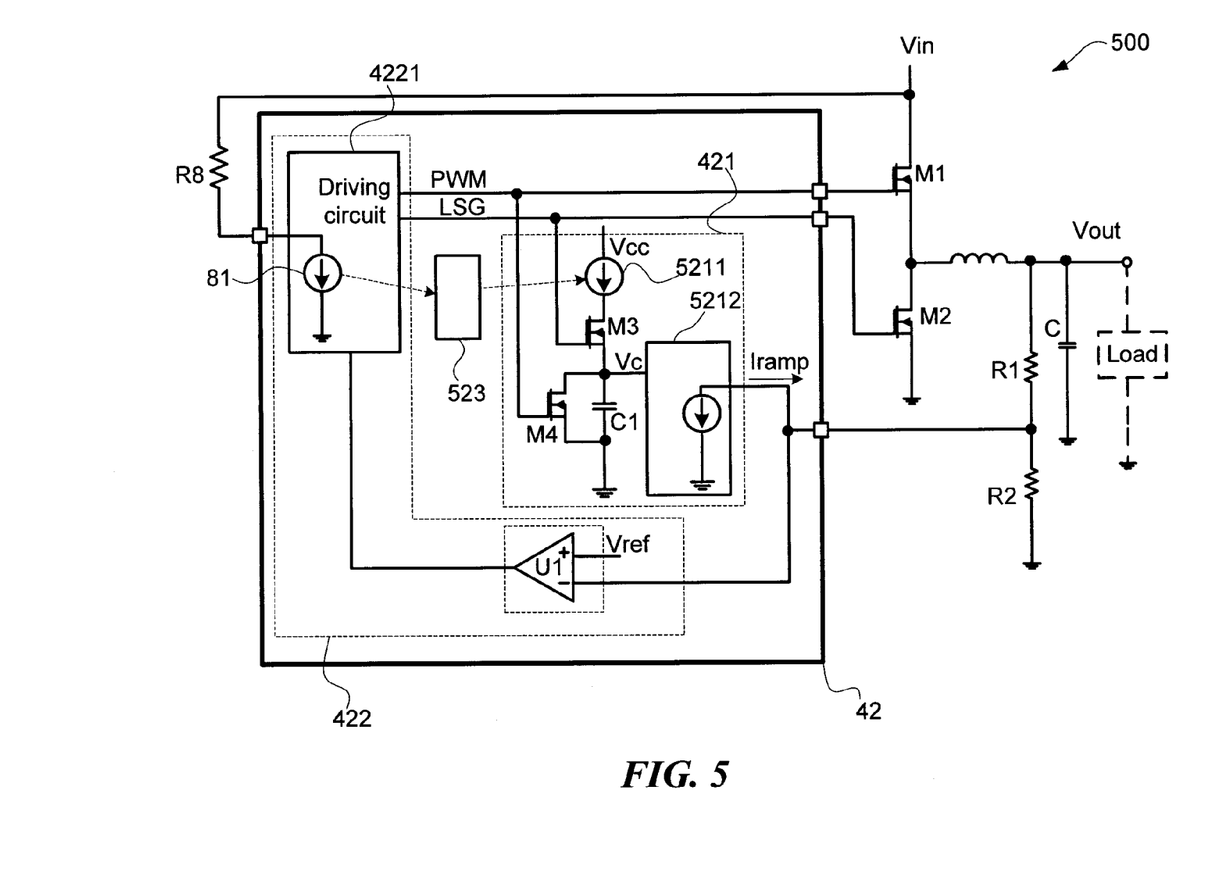
FIG. 5 illustrates a SMPS system with a specific ramp signal generator according to an embodiment of the present invention.

FIG. 5 illustrates a SMPS system 500 with a specific ramp signal generator 421 according to an embodiment of the present invention. SMPS system 500 comprises a switching-mode buck converter comprising a main switch M1, an output port OUT, a ramp signal generator 421 and a control signal generator 422, with reference to FIG. 4.

The ramp signal generator 421 comprises a current source 5211, a first switch M3, a second switch M4, a capacitor C1 and a current converter 5212. Switch M3 is coupled between current source 5211 and a voltage terminal $V_c$. Switch M3 has its control terminal controlled by the control signal LSG. Switch M4 is coupled between terminal $V_c$ and the ground terminal GND. And switch M4 has its control terminal controlled by the control signal PWM. Capacitor C1 is coupled across switch M4. Current converter 5212 is coupled to receive the voltage $V_c$, and converts the voltage $V_c$ into a current signal $I_{ramp}$. From the shown indication, ramp current signal $I_{ramp}$ is proportional to $V_c$ but has an opposite polarity. That is, a positive $V_c$ value is corresponding to a negative $I_{ramp}$. In the shown embodiment, switches M3 and M4 are MOSFET devices, and either M3 or M4 comprises a drain, a source and a gate. Wherein the drain of M3 is coupled to the current source 5211, the source of M3 is coupled to the terminal $V_c$ and the gate of M3 is coupled to receive the second control signal LSG. The drain of M4 is coupled the terminal $V_c$, the source of M4 is coupled to the ground terminal GND and the gate of M4 is coupled to receive the first control signal PWM.

Continuing with FIG. 5, in one embodiment, controller 52 further comprises a current mirror 523 coupled between a current source 81 of system frequency and the current source 5211 of ramp signal generator 421 for generating current source 5211 from the current source 81 of system frequency. The current source 81 is for controlling the system frequency and can be controlled by an external resistor R8, referring to FIG. 8 as described above. With the current mirror 523, current source 5221 follows the change of current source 81 of system frequency. When current source 81 is large and system frequency is high, current source 5211 is also large, and $V_c$ is charged with a high speed, or in other words, the slope of signal $V_c$ is high. Accordingly, the ramp voltage signal $I_{ramp}*R$ has a high slope and is accommodated to the high system frequency. And when system frequency is low, the slope of ramp voltage signal $I_{ramp}*R$ is low and the ramp voltage signal can also be accommodated to the low system frequency.

Figure 6A:
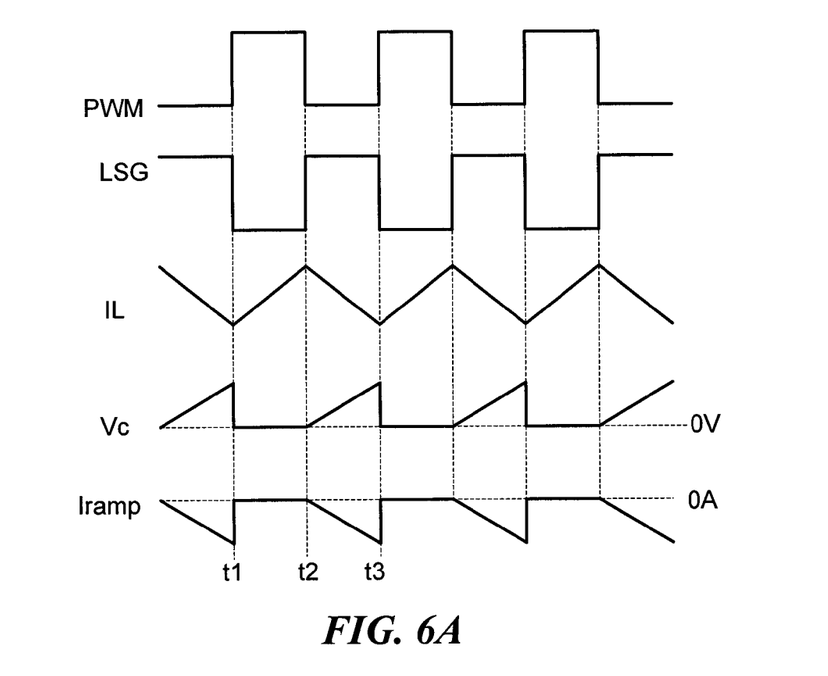
FIG. 6A illustrates waveforms of a plurality of signals of a SMPS system during a continuous current mode (CCM), according to an embodiment of the present invention.

FIG. 6A illustrates the waveforms of a plurality of signals to describe the function of a ramp signal generator during the continuous current mode (CCM) according to an embodiment of the present invention. The waveforms represent the first control signal PWM, the second control signal LSG, the inductor current IL, the voltage $V_c$ and the ramp current signal $I_{ramp}$ sequentially. Now the function of a ramp signal generator will be described with reference to FIG. 5. When PWM turns HIGH and LSG is LOW at time t1, switches M1 and M4 turn on, and switches M2 and M3 turn off. Accordingly, inductor current IL increases and meanwhile capacitor C1 is discharged and $V_c=0$. Since the ramp current signal $I_{ramp}$ is proportional to $V_c$ but has an opposite polarity, $I_{ramp}=0$. When LSG turns HIGH and PWM is LOW at time t2, switches M1 and M4 turn off, and M2 and M3 turns on. Accordingly, inductor current IL decreases and current source 5211 charges capacitor C1. Thus $V_c$ increases and $I_{ramp}$ decreases accordingly. During the period between t2 and t3, $I_{ramp}$ has negative value. It means that the ramp current $I_{ramp}$ flows from the external resistor module to the ramp signal generator 421. $I_{ramp}$ decreases until signal LSG is set LOW again at time t3. In this way, during the time period between time t2 and t3, $I_{ramp}$ has the same shape with the waveform of IL, or in other words, the ramp current signal $I_{ramp}$ simulates the inductor output current IL during the period when PWM is LOW and LSG are HIGH. In one embodiment, a dead time is adopted between LSG set LOW and PWM set HIGH, and between PWM set LOW and LSG set HIGH to avoid switching confliction.

Figure 6B:
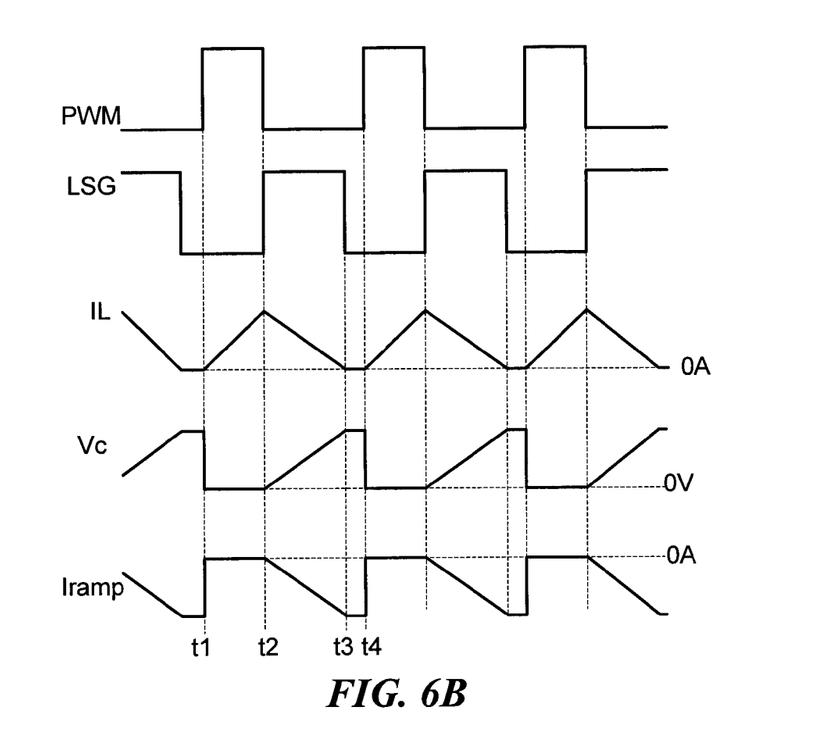
FIG. 6B illustrates waveforms of a plurality of signals of a SMPS system during a discontinuous current mode (DCM) according to an embodiment of the present invention.

FIG. 6B illustrates the waveforms of a plurality of signals to describe the function of a ramp signal generator during the discontinuous current mode (DCM) according to an embodiment of the present invention. The function of a ramp signal generator during DCM mode of a SMPS system will be described with reference to FIG. 5. At time t1, PWM turns HIGH and LSG is LOW. As described above, during the time period between t1 and t2, IL increases and $I_{ramp}$ equals zero. At time t2, LSG turns HIGH and PWM is LOW. As described above, during the time period between time t2 and t3, IL decreases and $I_{ramp}$ decreases accordingly. At time t3, IL decreases to zero and LSG is set LOW. Switches M3 and M4 turn off. And no current charges capacitor C1 and $V_c$ holds on. $V_c$ remains until the next pulse width modulation period comes when PWM turns HIGH again. Accordingly, the ramp current signal also holds on which will not decreases. Thus, the ramp current signal is similar to and can simulate the output inductor current IL during the period between t2 and t4 and can be used for ripple mode control.

Figure 7:
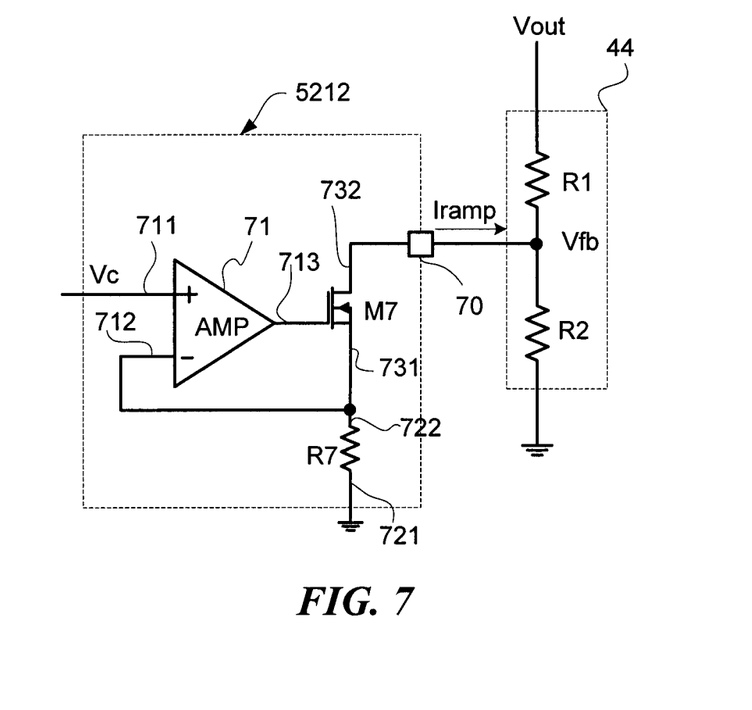
FIG. 7 illustrates a current converter of a ramp signal generator according to an embodiment of the present invention.

FIG. 7 illustrates a current converter 5212 of a ramp signal generator according to an embodiment of the present invention. Current converter 5212 comprises an operational amplifier 71, a resistor R7 and a transistor M7. Operational amplifier 71 comprises a first input 711 coupled to receive voltage $V_c$, a second input 712 and an output end 713. Resistor R7 has a first end 721 coupled to the ground and a second end 722 coupled to the second input 712 of amplifier 71. Transistor M7 comprises a control terminal coupled to the output 713 of the operational amplifier 71, a first output terminal 731 coupled to the second end 722 of resistor R7 and a second output terminal 732 coupled to the output 4213 of the ramp signal generator. In one embodiment, transistor M7 is a MOSFET. The resistance of transistor M7 is modulated by the output 713 of amplifier 71. Ideally, the voltage at the second input 712 of amplifier 71 equals $V_c$ at the first input 711 of amplifier 71 and no current flows through the input 712. Accordingly, the voltage drop across resistor R7 equals $V_c$, and the ramp current signal is:

$$I_{ramp} = -\frac{V_c}{R_7}.$$

In the shown embodiment, output 70 of the ramp signal generator 5212 is coupled to the feedback circuit 44 to combine the ramp voltage signal and the output voltage feedback signal together as a ripple mode feedback voltage $V_{fb}$, wherein $$v_{fb} = \frac{R_2}{R_1+R_2} v_{out} - \frac{R_2 \cdot R_1}{R_1+R_2} \cdot \frac{V_c}{R_7}.$$

Figure 9:
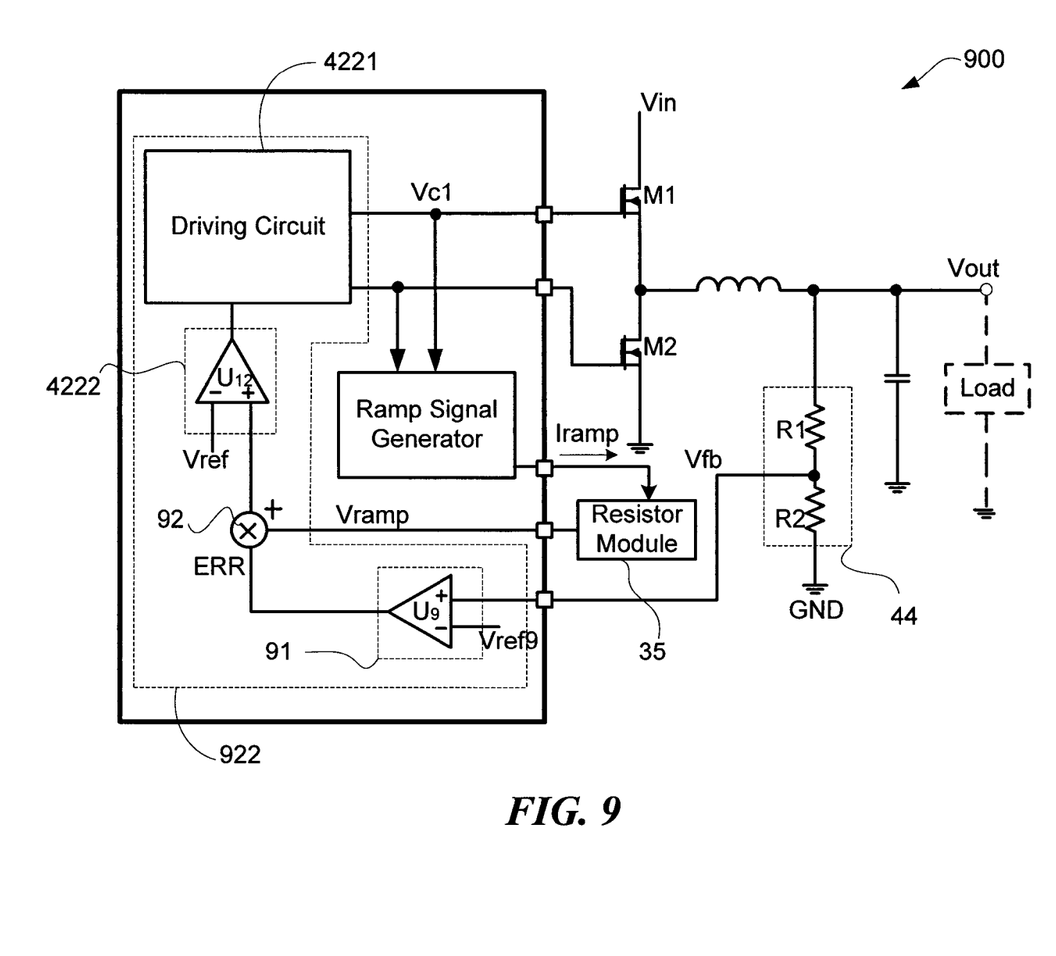
FIG. 9 illustrates another SMPS system where an error amplifier is adopted according to an embodiment of the present invention.

FIG. 9 illustrates another SMPS 900 with ripple mode control where an error amplifier 91 is adopted according to an embodiment of the present invention. The control signal generator 922 comprises an error amplifier 91, an adder 92, a comparator 4222 and a driving circuit 4221. SMPS 900 adopts a discrete resistor module 35 for converting the ramp current signal $I_{ramp}$ into a ramp voltage signal $V_{ramp}$. The output of feedback circuit 44 is coupled to a non-inverting input of error amplifier 91. And the feedback signal $V_{fb}$ of the output voltage $V_{out}$ is compared to a reference Vref9 and the difference between $V_{fb}$ and $V_{ref}$9 is amplified by error amplifier 91. Error amplifier 91 outputs an error signal ERR. The ramp voltage signal $V_{ramp}$ is added to signal ERR by the adder 92 for ripple mode control. The output of adder 92 is compared with a reference $V_{ref}$ by comparator 4222.

Figure 10:
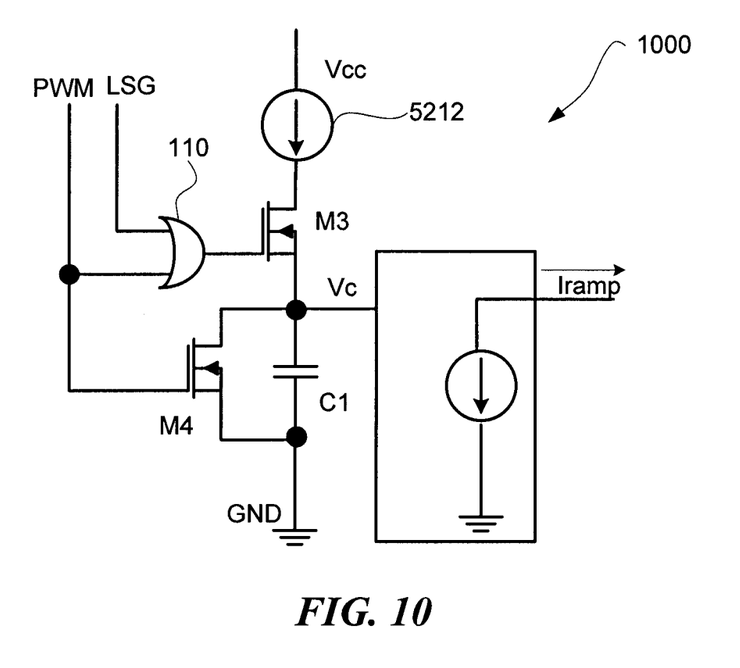
FIG. 10 illustrates a ramp signal generator according to another embodiment of the present invention.

FIG. 10 illustrates another embodiment of ramp signal generator 1000. Ramp signal generator 1000 is the same as ramp signal generator 421 shown in FIG. 5, except that ramp signal generator 1000 further comprises an OR gate 110. The first control signal PWM is supplied to the gate of switch M3 and one input of OR gate 110. The second control signal LSG is supplied to another input of OR gate 110. The output of OR gate 110 is supplied to the gate of switch M3. In this configuration, when PWM is logic HIGH and LSG is logic LOW, switches M3 and M4 both turn on and current source 5212 flows through M3 and M4 to the ground terminal GND. Accordingly, $V_c$ and $I_{ramp}$ are zero at this period.

Figure 11:
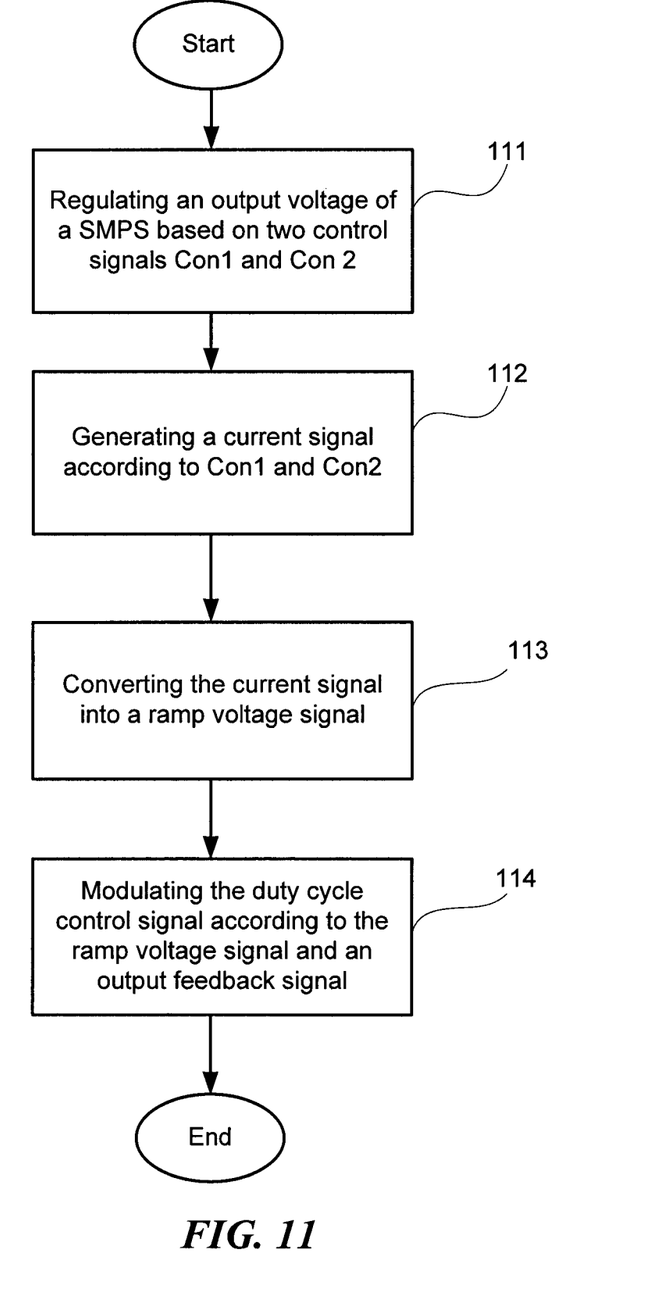
FIG. 11 illustrates a method of controlling a SMPS according to an embodiment of the present invention.

FIG. 11 illustrates a method of ripple mode control for controlling a SMPS according to an embodiment of the present invention. The method comprises regulating an output voltage of the SMPS by a first duty cycle control signal and a second duty cycle control signal in step 111, generating a current signal according to the first duty cycle control signal and second duty cycle control signal in step 112, converting the current signal into a ramp voltage signal in step 113 and modulating the duty cycle of the control signals according to the ramp voltage signal and an output voltage feedback signal in step 114. In one embodiment, the duty cycle control signals are PWM and LSG as shown in FIG. 4.

Figure 12:
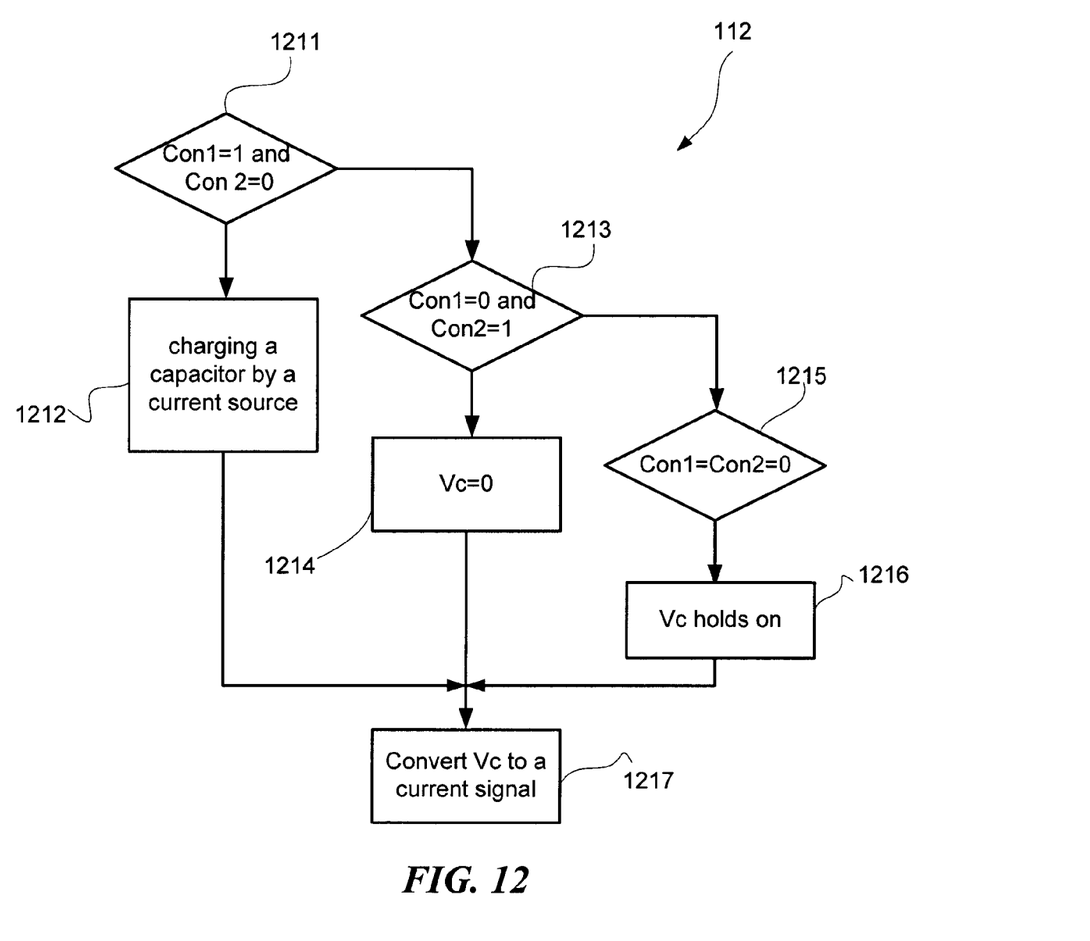
FIG. 12 illustrates a method of generating a current signal according to an embodiment of the present invention.

FIG. 12 illustrates a method of generating a current signal in step 112 according to an embodiment of the present invention. Referring to FIG. 4, the logic levels of the two duty cycle control signals PWM and LSG determine the output inductor current IL. During a first period when LSG is HIGH and PWM is LOW, the main switch turns off and the synchronous rectifier turns on, IL flows from the output port to the rectifier and IL decreases. When this period is detected in step 1211, a capacitor is charged with a current source, and the voltage across the capacitor $V_c$ increases in step 1212. In one embodiment, the current source is mirrored from a current source of system frequency as illustrated above with reference to FIG. 5 and FIG. 8. During a second period when PWM is HIGH and LSG is LOW, the main switch turns on and the synchronous rectifier turns off, IL increases. And when this period is detected in step 1213, the capacitor voltage $V_c$ is set to zero voltage. When the SMPS system works under DCM mode, a third period appears. During the third period, when IL decreases to zero voltage, LSG is set LOW. Control signals PWM and LSG keep LOW until the next cycle comes. When the third period is detected in step 1215, $V_c$ holds on in step 1216. The voltage $V_c$ is then converted into the current signal $I_{ramp}$, where current signal $I_{ramp}$ is proportional to $V_c$ but has an opposite polarity.

In one embodiment, the method further comprises modulating the ramp voltage signal by controlling the resistance of the resistor module. Wherein the resistor module shares a feedback circuit of the SMPS with reference to FIG. 4. As illustrate above, the ramp voltage signal is modulated by changing the two resistors of the feedback circuit with the same proportion. In this way, the ramp voltage signal can be modulated while the output voltage feedback signal component is not affected.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A switching-mode power supply (SMPS), comprising:
an output port configured to supply a load;
a control signal generator having an input and an output, wherein the output is configured to provide a first control signal;
a first switch configured to receive the first control signal, wherein the first switch is configured to regulate an output voltage at the output port;
a ramp signal generator comprising an input and an output, wherein the input of the ramp signal generator is configured to receive the control signal, wherein the output of the ramp signal generator is configured to provide a ramp current signal in accordance with the control signal, and wherein the output of the ramp signal generator is coupled to the input of the control signal generator; and
a resistor module converting the ramp current signal into a ramp voltage signal;
wherein the resistor module shares a feedback circuit of the SMPS, and the feedback circuit comprising two resistors, and wherein the ramp voltage signal is configured to be adjusted by changing the resistance values of the two resistors.

2. The SMPS of claim 1, wherein the ramp current signal simulates an output signal at the output port.

3. The SMPS of claim 1 comprising a buck converter, wherein the ramp current signal simulates an output inductor current when the output inductor current decreases.

4. The SMPS of claim 1, wherein the output of the ramp signal generator is coupled to the resistor module configured to generate the ramp voltage signal, and wherein the ramp voltage signal is coupled to the input of the control signal generator.

5. The SMPS of claim 1, wherein the feedback circuit comprising an input and an output, wherein:
the input of the feedback circuit is coupled to the output port;
the output of the feedback circuit is coupled to the output of the ramp signal generator; and
the control signal generator further comprises a comparator comprising two inputs and an output, wherein one input of the comparator is coupled to a reference voltage, wherein the other input of the comparator is coupled to the output of the feedback circuit, and wherein the first control signal is generated in accordance with the output of the comparator.

6. The SMPS of claim 1, wherein the control signal generator is configured to further generate a second control signal, and wherein the ramp signal generator comprises:
a current source;
a third switch coupled between the current source and a voltage terminal, wherein the third switch comprises a control terminal coupled to the second control signal;
a fourth switch coupled between the voltage terminal and a ground terminal, wherein the fourth switch comprises a control terminal coupled to the first control signal;
a capacitor coupled across the fourth switch; and
a current converter configured to convert the voltage at the voltage terminal to the ramp current signal.

7. The SMPS of claim 6, wherein the third switch and the fourth switch are metal oxide semiconductor field effect transistor (MOSFET) devices and wherein:

the third switch comprises a drain and a source, wherein the drain of the third switch is coupled to the current source and the source of the third switch is coupled to the voltage terminal; and the fourth switch comprises a drain and a source, wherein the drain of the fourth switch is coupled to the voltage terminal and the source of the fourth switch is coupled to the ground terminal.

8. The SMPS of claim 6, wherein the current converter comprises:
   a resistor, comprising a first end and a second end, and wherein the first end is coupled to the ground terminal;
   an operational amplifier, comprising two inputs and an output, wherein one input is coupled to the voltage terminal and the other input is coupled to the second end of the resistor; and
   a transistor comprising a control terminal and two output terminals, wherein the control terminal is coupled to the output of the operational amplifier, one output terminal of the transistor is coupled to the second end of the resistor and the other output terminal of the transistor is coupled to the output of the ramp signal generator.

9. The SMPS of claim 8, wherein the current converter further comprises a current mirror, coupled between the transistor and the output of the ramp signal generator.

10. The SMPS of claim 6 further comprising a current mirror coupled between a current source of system frequency and the current source of the ramp signal generator.

11. The SMPS of claim 6, wherein the ramp signal generator further comprises an OR gate comprising two inputs and an output, wherein one input of the OR gate is coupled to the first control signal and another input of the OR gate is coupled to the second control signal, and wherein the output of the OR gate is coupled to the control terminal of the third switch.

12. The SMPS of claim 1, wherein the first control signal is set ON for a predetermined period of time.

13. A ramp signal generator, comprising:
    a current source;
    a first switch, configured to be controlled by a first control signal;
    a second switch, configured to be controlled by a second control signal, wherein the first switch is coupled between the current source and the second switch, and wherein the second switch is coupled between the first switch and a ground terminal;
    a capacitor, coupled across the second switch; and
    a current converter, configured to convert the voltage drop across the capacitor to a current signal; and
    a current mirror coupled between a current source of system frequency and the current source of the ramp signal generator, wherein the current source of the ramp signal generator is mirrored from the current source of system frequency.

14. The controller of claim 13, wherein the first switch and the second switch are MOSFET devices.

15. The controller of claim 13, wherein the current converter comprises:
    a resistor, comprising a first end and a second end, and wherein the first end is coupled to a ground terminal;
    an operational amplifier, comprising two inputs and an output, wherein one input is coupled to receive the voltage drop across the capacitor, and the other input is coupled to the second end of the resistor; and
    a transistor, comprising a control terminal and two output terminals, wherein the control terminal is coupled to the output of the operational amplifier, one output terminal of the transistor is coupled to the second end of the resistor and the other output terminal of the transistor is coupled to the output of the ramp signal generator.

16. A method of controlling a switching-mode power supply (SMPS), comprising:
    regulating an output voltage of the SMPS by a first control signal and a second control signal;
    generating a ramp current signal according to the first control signal and the second control signal;
    converting the ramp current signal into a ramp voltage signal by a resistor module; and
    modulating the first control signal and the second control signal according to the ramp voltage signal and an output feedback signal;
    wherein the resistor module shares a feedback circuit of the SMPS, wherein the feedback circuit is a voltage divider comprising two resistors, and wherein the ramp voltage signal is adjusted by changing the resistance values of the two resistors.

17. The method of claim 16, wherein generating the ramp current signal comprises:
    charging a capacitor by a current source when the first control signal is logic LOW and the second control signal is logic HIGH;
    discharging the capacitor to zero voltage when the first control signal is logic HIGH and the second control signal is logic LOW;
    holding on the voltage across the capacitor when both the first control signal and the second control signal are logic LOW; and
    converting the voltage across the capacitor into a current signal.

18. The method of claim 17, wherein the current source is mirrored from a current source of system frequency.

19. The method of claim 16, wherein the ramp voltage signal is adjusted by changing the two resistors with the same proportion.

* * * * *